United States Patent
Lu

(10) Patent No.: US 10,152,052 B1
(45) Date of Patent: Dec. 11, 2018

(54) PORTABLE SINGLE-HANDED REMOTE CONTROL SYSTEM FOR UNMANNED AERIAL VEHICLE

(71) Applicant: Ning Lu, Shanghai (CN)

(72) Inventor: Ning Lu, Shanghai (CN)

( * ) Notice: Subject to any disclaimer, the term of this patent is extended or adjusted under 35 U.S.C. 154(b) by 0 days.

(21) Appl. No.: 15/338,135

(22) Filed: Oct. 28, 2016

Related U.S. Application Data

(60) Provisional application No. 62/247,741, filed on Oct. 28, 2015.

(51) Int. Cl.
    *G05D 1/08*      (2006.01)
    *G05D 1/00*      (2006.01)
    *B64C 39/02*     (2006.01)

(52) U.S. Cl.
    CPC ......... *G05D 1/0016* (2013.01); *B64C 39/024* (2013.01); *G05D 1/005* (2013.01); *B64C 2201/146* (2013.01)

(58) Field of Classification Search
    CPC .... G05D 1/0016; G05D 1/005; B64C 39/024; B64C 2201/146
    See application file for complete search history.

(56) References Cited

U.S. PATENT DOCUMENTS

| | | | | |
|---|---|---|---|---|
| 7,931,239 B2* | 4/2011 | Pedersen | ................ | B60V 1/06 244/189 |
| 7,980,402 B2* | 7/2011 | Brendel | ................ | B66C 13/40 212/285 |
| 8,258,917 B2* | 9/2012 | Cai | ................ | G06F 3/0346 180/167 |
| 8,366,549 B2* | 2/2013 | Garcia | ................ | A63F 13/24 463/38 |
| 9,073,532 B2* | 7/2015 | Pedersen | ................ | B60V 1/06 |
| 9,226,330 B2* | 12/2015 | Abdurrahman | ..... | H04W 76/023 |
| 9,268,336 B2* | 2/2016 | Erhart | ................ | A63H 30/04 |
| 9,524,648 B1* | 12/2016 | Gopalakrishnan | ...... | B64C 39/00 |
| 9,547,380 B2* | 1/2017 | Parazynski | ............ | G08C 19/16 |
| 9,645,580 B2* | 5/2017 | Pedersen | ................ | B60V 1/06 |
| 2006/0262000 A1* | 11/2006 | Strong | ................ | G08C 17/00 341/176 |
| 2008/0210653 A1* | 9/2008 | Brendel | ................ | B66C 13/40 212/285 |
| 2008/0223993 A1* | 9/2008 | Spirov | ................ | B60V 1/06 244/23 A |
| 2008/0231465 A1* | 9/2008 | Lee | ................ | G08C 17/00 340/13.25 |
| 2009/0153349 A1* | 6/2009 | Lin | ................ | G06F 3/0346 340/4.3 |

(Continued)

*Primary Examiner* — Peter D Nolan
(74) *Attorney, Agent, or Firm* — Plager Schack LLP

(57) ABSTRACT

A single-handed hand held remote control for unmanned aerial vehicles (UAVs) is disclosed. The remote control includes a throttle control and a motion sensor(s) to detect various hand movements that can be mapped to various degrees of freedom. As the user moves the remote control, a micro-processor takes sampled data from the motion sensor(s) and determines a hand gesture which is used to identify a control instruction for the UAV. The control instruction is then transmitted via radio signal to the UAV to move the UAV accordingly. Some embodiments include a wrist member with its own motion sensor to improve on the movement sensing and provide enhanced control features.

9 Claims, 9 Drawing Sheets

(56) References Cited

U.S. PATENT DOCUMENTS

| | | | |
|---|---|---|---|
| 2011/0204187 A1* | 8/2011 | Spirov | B60V 1/06 244/190 |
| 2012/0021834 A1* | 1/2012 | Garcia | A63F 13/24 463/38 |
| 2012/0081216 A1* | 4/2012 | Lee | G08C 17/00 340/12.22 |
| 2015/0072619 A1* | 3/2015 | Abdurrahman | H04W 76/023 455/41.2 |
| 2015/0140934 A1* | 5/2015 | Abdurrahman | H04W 76/023 455/41.2 |
| 2015/0202540 A1* | 7/2015 | Erhart | A63H 30/04 340/12.5 |
| 2016/0306349 A1* | 10/2016 | Lau | G05D 1/0016 |

* cited by examiner

PORTABLE SINGLE-HANDED REMOTE CONTROL SYSTEM FOR UNMANNED AERIAL VEHICLE

CROSS-REFERENCE TO RELATED APPLICATIONS

This application claims benefit under 35 U.S.C. § 119(e) of U.S. Provisional Application having Ser. No. 62/247,741 filed Oct. 28, 2015, which is hereby incorporated by reference herein in its entirety.

BACKGROUND

The embodiments herein relate generally to electronic controllers, and more particularly to a portable single-handed remote control system for unmanned aerial vehicle.

There is a variety of devices which are commonly and widely used for controlling Unmanned Aerial Vehicle. For example, a conventional remote control is generally quite large in dimension and needs both hands to operate. Some controllers include two control sticks with at least 2 degrees of freedom (DOF) horizontal each. A DOF typically represents a "channel" to control a UAV's pitch/yaw/roll, and throttle. In a typical configuration, one stick can control throttle and yaw. The other stick controls pitch and roll. The remote controller communicates with the UAV using a radio link.

A smart phone which has internal motion sensors may be used to control a UAV. Typically a user will hold the smartphone in his palm and move his hand or arm and the internal motion sensors can sense the user's hand motion, and use this motion to simulate a UAV's movement in the pitch/yaw/roll axes, or throttle.

A Myo™ arm band is a wearable device which can detect movements via arm gestures by sensing the nerve signal from a muscle. The device can capture the movement of a user's hand, including the motion of fingers, wrist, etc. By assign different actions to different arm gestures, a user can define for example, corresponding flight control instructions and send the instructions to the UAV to control its flight.

The Kinect™ system is Microsoft's™ 3D motion capture camera system. User movement may be captured translated into corresponding flight instruction. This technology requires a Kinect™ camera to be mounted somewhere in the scene. Thus, its use is impractical for most UAV applications.

The Nintendo™ Wii™ remote control uses an optical sensor and an accelerometer to detect hand gestures. The controller is accompanied by a sensor bar that registers signals from within a limited distance to control virtual movement on a game display.

These devices may be suitable under some static environments, but they are ineffective in many dynamic situations, especially those involving extreme conditions such as surfing, skiing, sailing and etc. For instance, some people control a UAV while performing extreme sporting activities, and it becomes difficult for example for a skier to use a conventional remote control that requires both hands to carry and operate, while still engaging in skiing. In addition, the prior art control devices lack the operability during the moving conditions.

As can be seen, there is a need for increasing the portability and flexibility of controller for use in a wide variety of different dynamic situation. Additionally, there is a need for providing a more effective and precise control device for use in high-action sporting activities, especially those involving extreme conditions.

SUMMARY

In one aspect of the disclosure, a remote control system for an unmanned aerial vehicle (UAV) comprises a single-handed, hand held control housing; a push button throttle control in the control housing; a first motion sensor integrated into the hand held control housing; a radio transmitter in the hand held control housing; a micro-processor coupled to the push button throttle control, the radio transmitter, and the first motion sensor, wherein the micro-processor is configured to: detect a hand based movement by the first motion sensor; determine a type of the detected hand based movement; determine a mapped control instruction based on the determined type of hand based movement; and transmit the mapped control instruction to the UAV through the radio transmitter.

BRIEF DESCRIPTION OF THE FIGURES

The detailed description of some embodiments of the invention is made below with reference to the accompanying figures, wherein like numerals represent corresponding parts of the figures.

FIG. 1 includes an enlarged partial view of the remote control with internal parts shown.

DETAILED DESCRIPTION OF CERTAIN EMBODIMENTS

Embodiments disclosed herein generally provide an unmanned aerial vehicle (UAV) controller adaptable for use in a variety of dynamic or high activity sporting conditions. The present invention enhances pre-existing concepts in controller technology by incorporating a unique system of attaching multiple handhold or wearable controller components upon the user so as to increase the portability, conveniences, precision and overall effectiveness of the UAV controller during dynamic environments like traveling, outdoor, or extreme sporting conditions.

Figure 1:
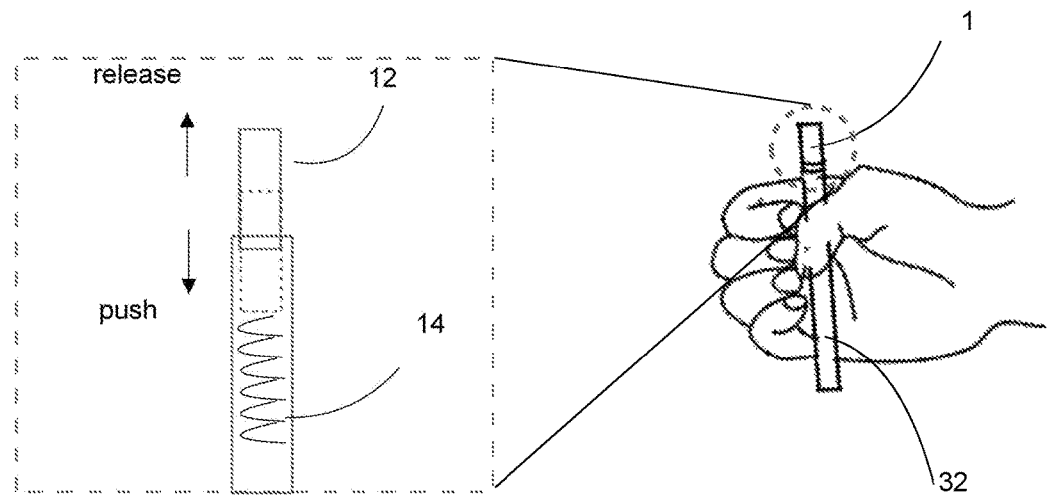
FIG. 1 is a side view of a remote control for a UAV held in a user's grasp during use according to an exemplary embodiment.
Figure 2:
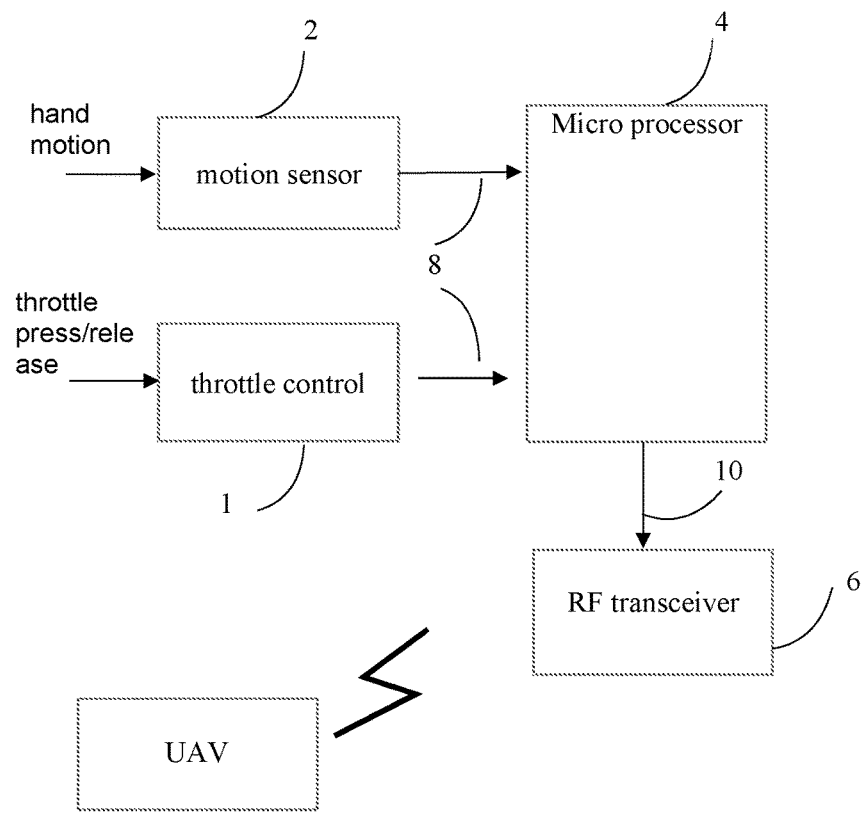
FIG. 2 is a block diagram of the elements in the remote control of FIG. 1 according to an embodiment.

Referring now to FIGS. 1 and 2, an exemplary embodiment of a UAV remote control 32 (sometimes referred to as a "hand member 32" or "stick 32") is shown. The embodiment shown provides a device which is both wearable and portable for use in a variety of different dynamic environments, including roads, mountains, aquatic, snowy, and the like. The remote control 32 allows an easy and intuitive operation of a UAV with a single hand by simply moving or rotating the user's hand, wrist and arm. The UAV remote control 32 may have a pole-shaped or stick-shaped housing and may include a throttle control member 1, a motion sensor member 2, a micro-processor 4, and a RF transceiver member 6. The throttle control member 1 may include a spring-biased push button 12. A spring 14 controls the position of the push button 12 between a depressed and a default position as is known in the art. The throttle control member 1 can convert the length of spring 14's travel into an electric signal, which may be used to determine UAV control. As will be understood, electrical components and connections may be coupled together via a circuit board as is known in the art, even if not physically shown that way in the illustrations.

The micro-processor 4 may be for example an Advanced RISC Machine (ARM) based system on chip (SoC), with multiple I/O and ADCs. In operation, the micro-processor 4 receives sampled data 8 from the throttle control member 1 and converts it into throttle values to control the speed of the UAV. When the push button 12 is completely released, the output value may be mapped to zero. When the push button 12 is pushed down to its fully depressed position, the output value is mapped to the maximum threshold for speed. In some embodiments, pressing the push button 12 between its fully released position and its fully depressed position may accelerate/decelerate the UAV. As will be understood, mapping the throttle control between the fully released position and fully depressed position may be reversed if desired.

The motion sensor 2 may be for example, one or more inertial measurement units (IMU), including for example G-sensors, gyroscopes, and compasses. The IMUs can be on separate ICs, or they also can be integrated into one single chip. The sampled data 8 from these sensors 2 can translate the instant motion of user's hand in a three dimensional world coordinate system. Generally speaking, operation of the UAV by the remote control 32 begins with the fingers of a single hand wrapped around the housing so that the remote control 32 is grasped in a default center position with the throttle control 1 pointed upward and away from gravity (for example as shown in FIG. 1). As the user moves the hand or arm, the micro-processor 4 uses software to convert the sampled data 8 translating the hand/arm movements into the estimated attitude data 10 of the hand in real time. The resulting instruction 10 as determined by the detected hand movement and/or throttle control data may be transmitted from the RF transceiver 6 to the UAV.

Figure 3:
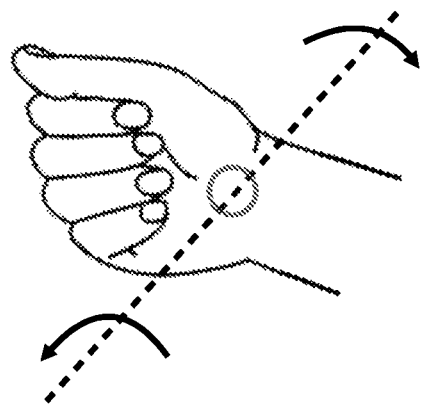
FIG. 3 is a depiction of radial/ulnar deviation hand movements which may be mapped to a control instruction for the remote control of FIG. 1.
Figure 4:
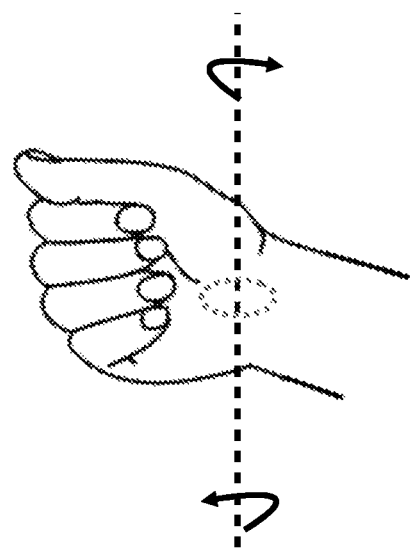
FIG. 4 is a depiction of flexion/extension hand movements which may be mapped to a control instruction for the remote control of FIG. 1.
Figure 5:
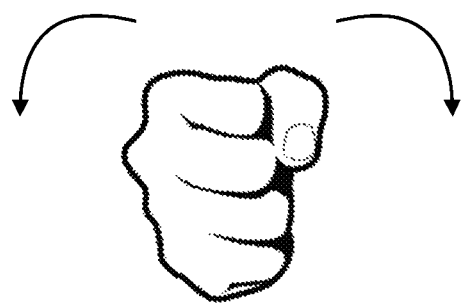
FIG. 5 is a depiction of pronation/supination hand movements which may be mapped to a control instruction for the remote control of FIG. 1.

FIGS. 3-5 show examples of various hand movements that are detectable by for example, the motion sensors 2. For example, radial/ulnar deviation, flexion/extension, and pronation/supination may be mapped to UAV control commands which may translate for example into pitch/yaw/roll of the UAV. As may be appreciated, the hand movements may be mapped to mimic the associated pitch/yaw/roll of the UAV providing an intuitive or natural control of the UAV. For example, as shown in FIG. 3, the use of radial/ulnar deviation may resemble the pitch of the UAV up or down and thus may be mapped to pitch control. Similarly, the use of flexion/extension may resemble turning the UAV and thus may be mapped to yaw control. Pronation/supination may resemble rotating the UAV and may be mapped to roll control. While the above description is of an exemplary embodiment, it will be understood that the hand movements described may be mapped to different controls. Still yet, different hand movements may be added or used providing even more channels of UAV control.

Figure 6:
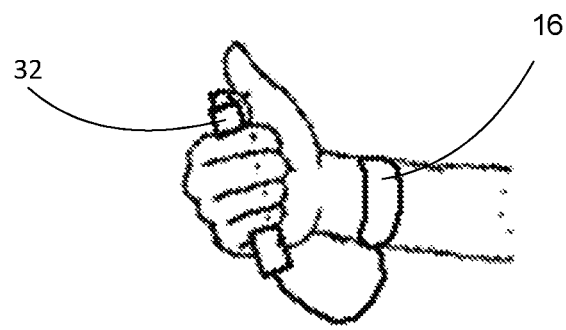
FIG. 6 is a side view of a remote control system for a UAV held in a user's grasp during use according to another exemplary embodiment
Figure 7:
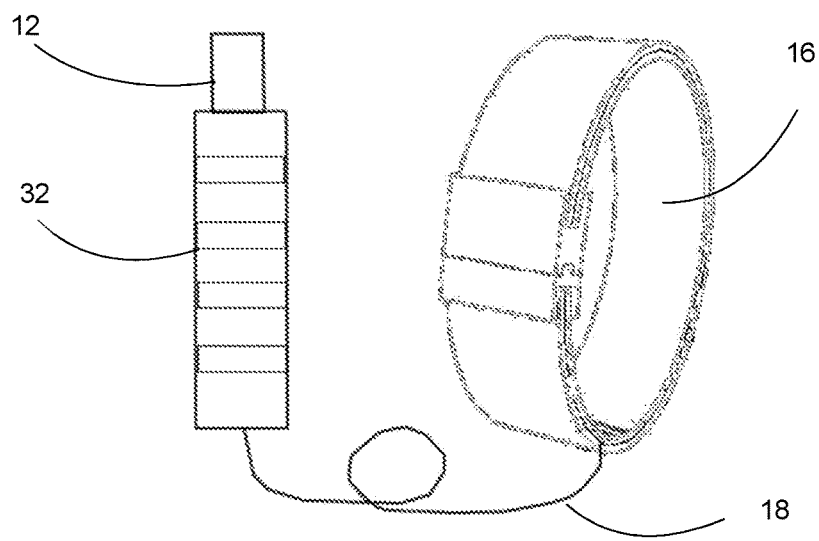
FIG. 7 is an enlarged view of the remote control system of FIG. 6.

Referring now to FIGS. 6 and 7, another remote control system is shown which may add a wrist member 16 (sometimes referred to as "wrist band 16") attached to the remote control 32 by an electronic tether 18. The remote control 32 is similar and functions similarly to the embodiments described above. The embodiment shown provides an improved control device which is wearable to the user's wrist and hand to provide enhanced battery life and prevents the user from dropping the device. The wrist member 16 may include a battery with larger capacity than the remote control 32. The tether 18 may provide an electrical connection to provide power between the wrist member 16 and remote control 32. The wrist member 16 may have a cableshaped surface, which may be flexible in length. In some embodiments, the wrist member 16 and remote control 32 share a wireless connection. In one aspect, the embodiment shown provides ease of use wherein if the user is done controlling the UAV, he or she only needs to release the remote control 32 and the tether 18 prevents the remote control 32 from falling.

Figure 8:
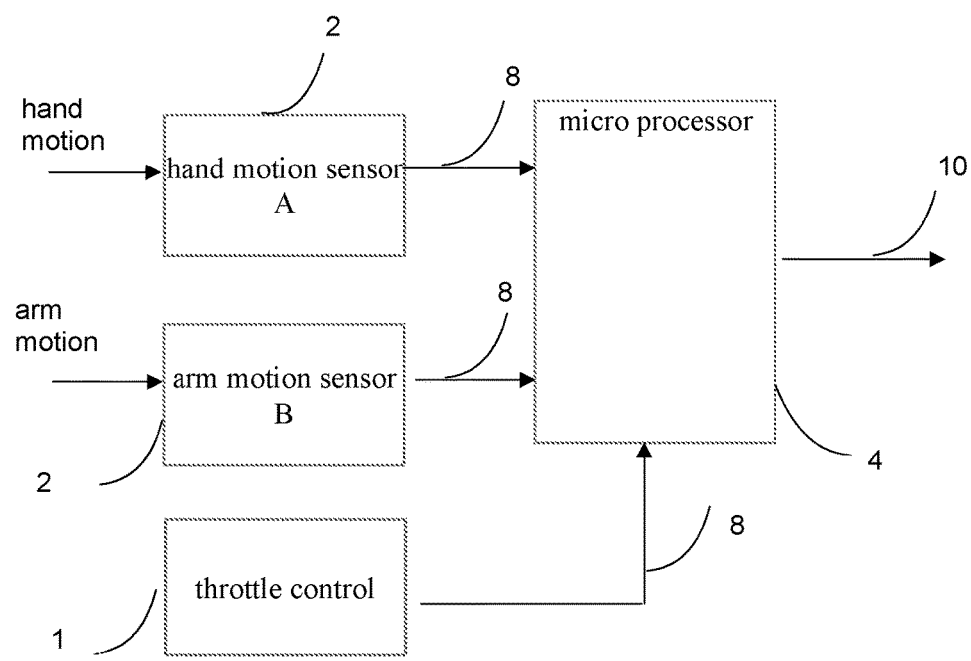
FIG. 8 is a flow of command signals for a remote control system according to still yet another embodiment with a dedicated motion sensor in a wrist member.
Figure 9:
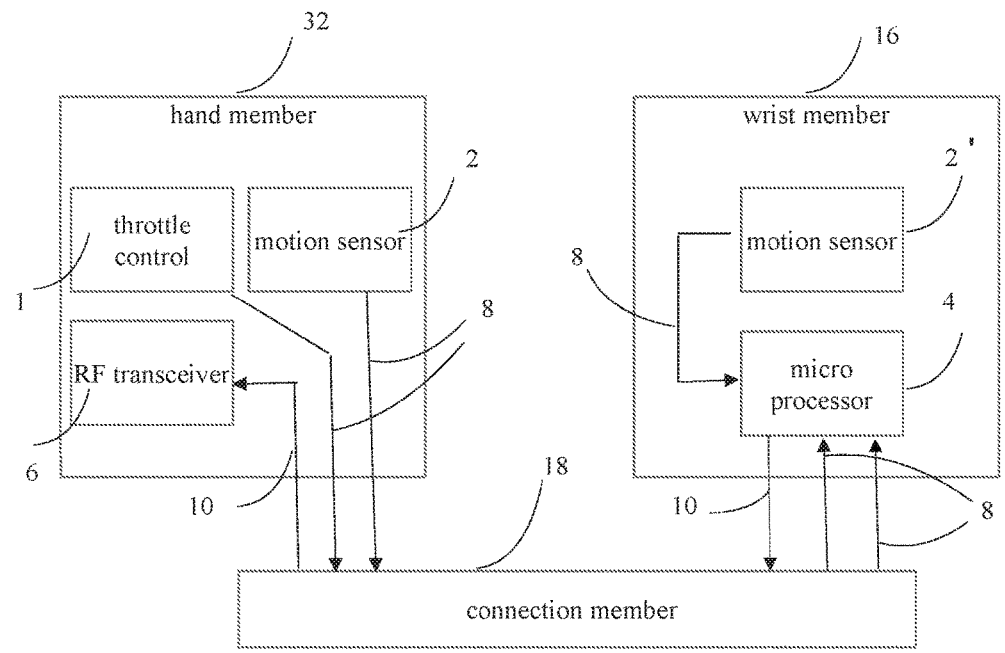
FIG. 9 is a block diagram of the elements in the remote control system of FIG. 8 according to an embodiment.

Referring now to FIGS. 8 and 9, an improved embodiment of the UAV remote control can be achieved by adding another motion sensor member 2' dedicated to registering arm gestures. In the embodiment shown, an improved control apparatus is provided that can sample both the motion of the hand and arm. This apparatus has a hand member (remote control 32) as described above, and a wrist member 16. Both the hand held remote control 32 and the wrist member 16 include respectively a motion sensor 2. The micro-processor 4 may be moved from the remote control 32 (as described above) to the wrist member 16 (which for example may be a wristband or armband). For embodiments with the wrist member 16 having a larger battery source, it may thus be advantageous to locate the micro-processor 4 in the wrist member 16 for efficient use of battery power. The hand held remote control 32's motion sensor 2, throttle control 1, and RF transceiver 6 may all be connected to the micro-processor member 4 in the wristband 16 through the connection cable 18. In operation, the motion sensor 2' in the wristband 16 can sample the instant motion of a user's arm. Thus the microprocessor 4 can receive sampled data 8 from the two motion members 2 and 2' in both the stick 32 and the wristband 16 simultaneously, which means the attitude/rotation of the user's hand and arm may be determined at the same time.

Figure 11:
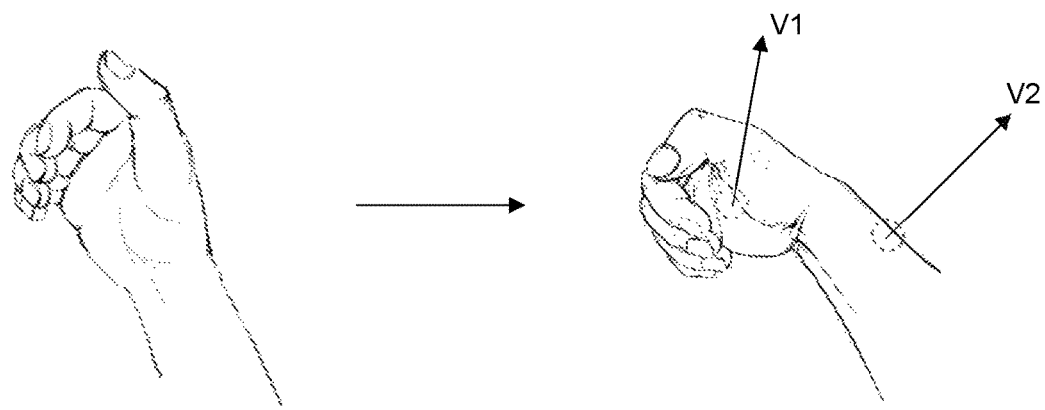
FIG. 11 is an illustration showing the resulting vectors for hand and arm movement that may be used to determine a mapped control gesture for the remote control system of FIG. 7 according to an embodiment.

Each sample of attitude data 10 can be represented as a vector in a world coordinate system as represented for example in FIG. 11. The micro-processor 4 may then use the "space distance" between the two vectors, which reflect the relative position of the hand and the arm, to calculate the targeted UAV attitude independent of the user's distance from the UAV. As an example if in a world coordinate system the hand attitude vector is $\vec{v_1}$, and the arm attitude vector is $\vec{v_2}$, then the space distance can be defined as: $\vec{v_1} - \vec{v_2}$. The micro-processor 4 may then project the resultant vector of space distance into the local coordinate system for the arm motion sensor 2', and converts the projection to targeted UAV attitude controlling parameters. As will be understood, given two vectors of hand and arm attitudes, many different functions $f(\vec{v_1}, \vec{v_2})$, may exist that can calculate the space distance.

Figure 10:
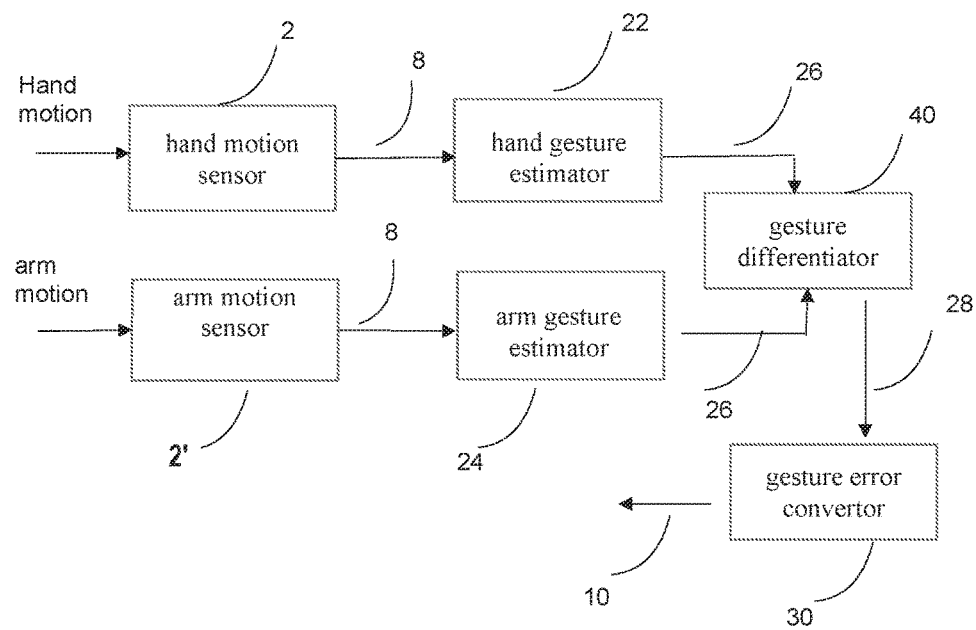
FIG. 10 is a flowchart for a process of determining a gesture according to an exemplary embodiment.

Referring now to FIG. 10, a process for determining a gesture from hand and arm movements is shown. The process may be performed by the micro-processor 4. The process includes receiving sampled data 8 from the hand member and wrist member motion sensors 2 and 2'. The sampled data 8 from the hand associated motion sensor 2 may be used to estimate which hand gesture was performed in sub-routine 22. Similarly, the sampled data 8 from the wrist associated motion sensor 2' may be used to estimate an arm gesture performed in sub-routine 24. Each of sub-routines 22 and 24 result in sampled data 26 which may then be provided to the gesture differentiator 40, which determines the gesture performed. In some embodiments, the results 28 from the gesture differentiator 40 may be fed to a gesture error converter 30. The gesture error converter 30 converts the output of the gesture differentiator 40 (which is the error between the hand gesture and arm gesture vector). The output 28 from the gesture error converter 30 is then provided as the control instruction 10 sent to the UAV.

Figure 12:
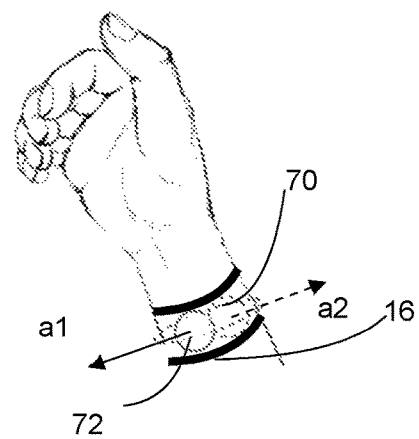
FIG. 12 is an illustration showing roll detection in a wrist worn sensor according to an embodiment.
Figure 13:
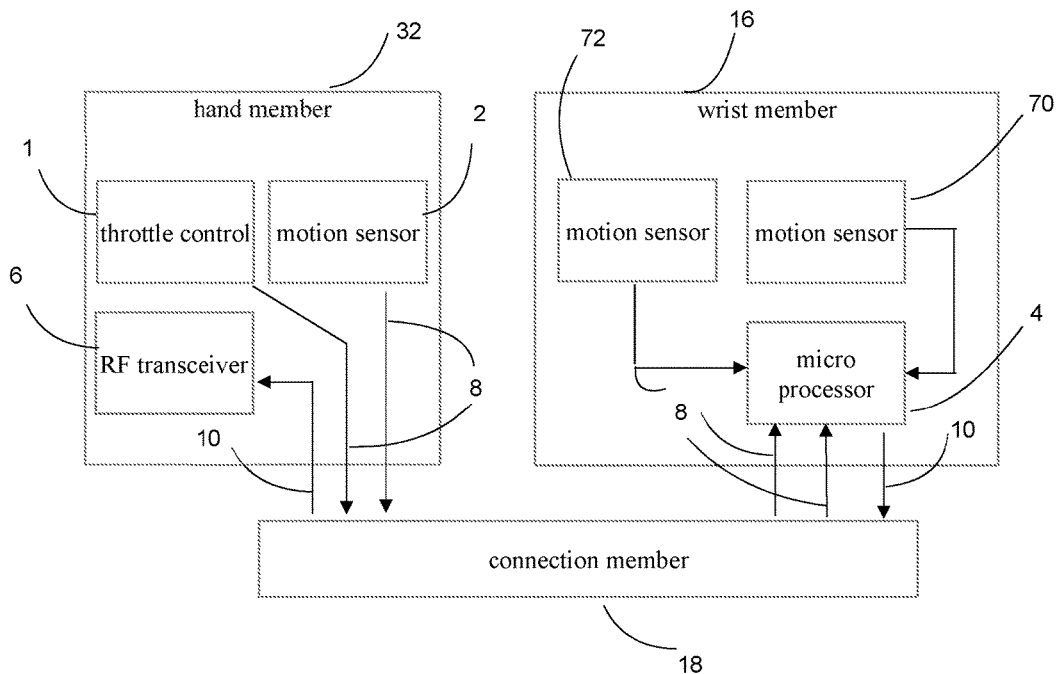
FIG. 13 is a block diagram of the elements in a remote control system according to an embodiment that includes two wrist sensors.

Referring now to FIGS. 12 and 13, another embodiment is shown which improves the stability of roll control in dynamic environments. The embodiment shown in FIG. 12 provides an improved control device and a control method, which can still provide accurate control even when uses in dynamic environments (moving vehicle, surfing, boating, sailing, and etc.). The wrist member 16 may include two motion sensors instead of one as described previously. One sensor member 70 may be positioned on inner side of the wrist band 16, and the other sensor 72 may be positioned on the outer side of the wrist band 16. In an exemplary embodiment, the two sensors 70 and 72 are installed axially symmetrically around the user's wrist. For sake of illustration, this is represented by the sensor 70 shown in a dashed line to represent it being on the opposite side of the wristband from the sensor 72. In addition, while the sensors 70 and 72 are shown off-set from each other, this is again for sake of illustration and it will be understood that in some embodiments, they may be positioned planar to each other on opposite sides of the wristband. The output of the two sensors 70 and 72 will be vectors pointing in opposite directions when the user makes a roll gesture. The vectors may be represented by $\vec{a_1}$ and $\vec{a_2}$. The targeted roll of UAV can be calculated by following formula: $\vec{a_1} - \vec{a_2}$, although various functions may be used to calculate the amount of roll that to be performed by the UAV. In some embodiments, the extra motion sensor can be placed in a different location, (for example, this extra motions sensor can be placed in the hand member 32 instead of wrist member 16), in a way that the two motion sensors 70 and 72 are symmetrically located in the head and the rear end of the hand member 32. As might be appreciated, in a dynamic environment, when the platform that the person is standing on is not stable, (for example, when standing on a boat floating in the sea, or in a moving car, or the person is paragliding) the movement of the platform or the body of the person will introduce a roll component in the motion vector sensed in addition to the user's arm gesture. The resultant vector calculation will be different than the movement wanted by the user causing the UAV to receive the wrong control instructions that may lead to a dangerous result. As will be appreciated, the extra sensor may solve the issue of roll by compensating for the motion component around the axis of the user's arm into the calculated control command to the UAV.

Figure 14:
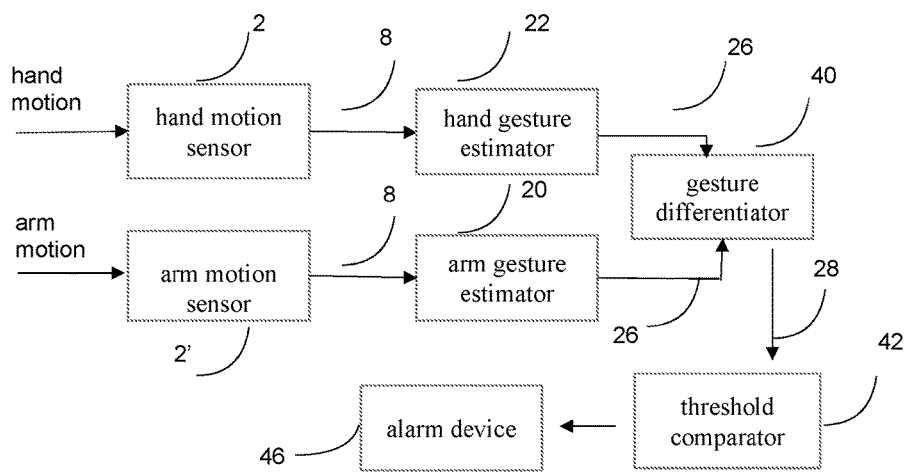
FIG. 14 is a block diagram of software components operating on the remote control system to determine a user's hand in a default position according to an embodiment.

Referring now to FIG. 14, the embodiment shown provides an improved control device which can interact with the user by providing sensory feedback to the user during piloting. The control device may include a detector in wrist member 16 and an alarm 46 connected to either the hand member 32 or the wrist member 16. The detector (threshold comparator 42 which monitors the output of the gesture differentiator 40) detects error between the attitude of the hand and arm instantly. When the error is lower than a threshold, the control device may notify user by triggering the alarm 46 indicating that the control device (hand member 32) has returned to a center position. Determining the default center position may be performed by software running on the microprocessor 4 which acts as threshold comparator 42. When the error of gesture output from gesture differentiator 40 is lower than the threshold value, the user's hand is determined to have returned back to the default center position. The threshold comparator 42 then triggers the alarm 46 to notify the user. The alarm 46 can be audible sound, a flashing LED, or a vibrating motor. Embodiments may include the motor members added into the stick (hand member 32), the inner side of the wrist band 16, and the outer side of the wrist band 16.

Figure 15:
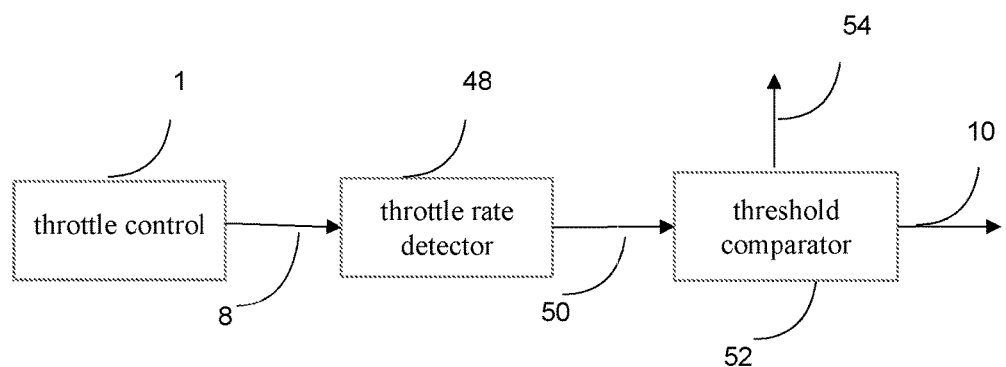
FIG. 15 is a flowchart for a process determining a user's release of throttle control according to an embodiment.

FIG. 15 shows an embodiment for detecting the release of throttle control for the UAV. A throttle rate detector 48 in the form of a hardware or software module (which may run for example on microprocessor 4 or a dedicated piece of hardware) detects how fast a throttle rate 50 value is changing. A threshold comparator 52 may check if the throttle rate is changing faster than a threshold value. Based on the results of the throttle rate detector 48 and the threshold comparator 52, it may be determined whether the throttle control has been released and if so, may immediately trigger a status transition instruction signal 54 (for example, change to hover/glide status) sent to the UAV.

Figure 16:
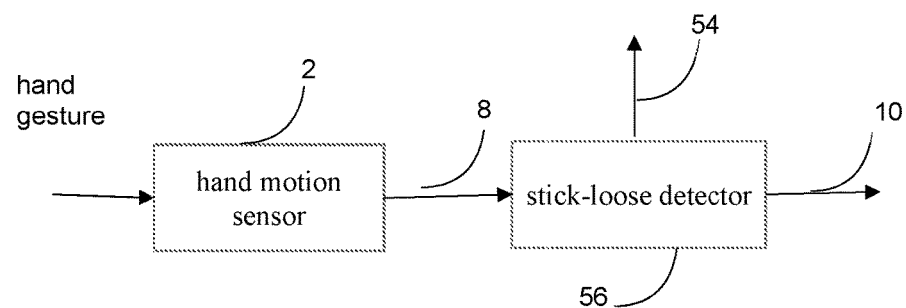
FIG. 16 is a flowchart for a process determining a user's release of a control stick according to an embodiment.

FIG. 16 shows an embodiment which provides an improved control device which can automatically detect release of the hand member 32 in real-time, so that a user can safely release control with his hand during piloting, without causing the UAV to lose control or crash. In this embodiment, another detector (a software or hardware module) is added to the control device. A "stick-loose" module 56 4detects the output of the motion sensor 2 in the hand member 32, and may immediately send a status transition instruction to the UAV once it detected the hand member 32 is for example, dropped by the user's hand (or intentionally released from grasp). For example, when the output of the G-sensor (motion sensor 2) inside the hand member is zero, but the G-sensor (motion sensor 2) inside the wrist member 16 is not, the module 56 may determine that the stick (hand member 32) is not within the user's grasp. The module 56 may immediately trigger a status transition instruction signal 54 (for example, change to hover/glide status) sent to the UAV.

Figure 17:
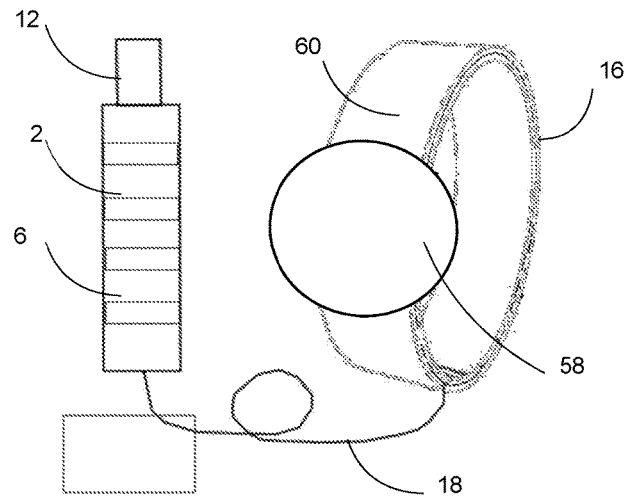
FIG. 17 is a side view of a remote control system for a UAV according to another exemplary embodiment that includes a digital display.

As shown in FIG. 17, in another embodiment, the wrist member 16 may include a watch shaped LCD 58 a GPS module (not shown) to provide geolocation information of the user, and a wireless signal module 60 (using for example, Wi-Fi or Bluetooth™ based signals). The embodiment shown provides an improved control device with electronic tethering functionality, which can share data with other devices, including for example smartphones, computing tablets, smart glasses and other wearable smart devices. As will be appreciated, the control of the UAV is enhanced by tethering control to include the other computing devices. Information such as route control instructions can be mapped to the UAV and the user's control power is extended by the ability to receive and send enhanced information to/from the UAV. The micro-processor 4 can be connected to external devices and may communicate with the other to control the UAV.

Figure 18:
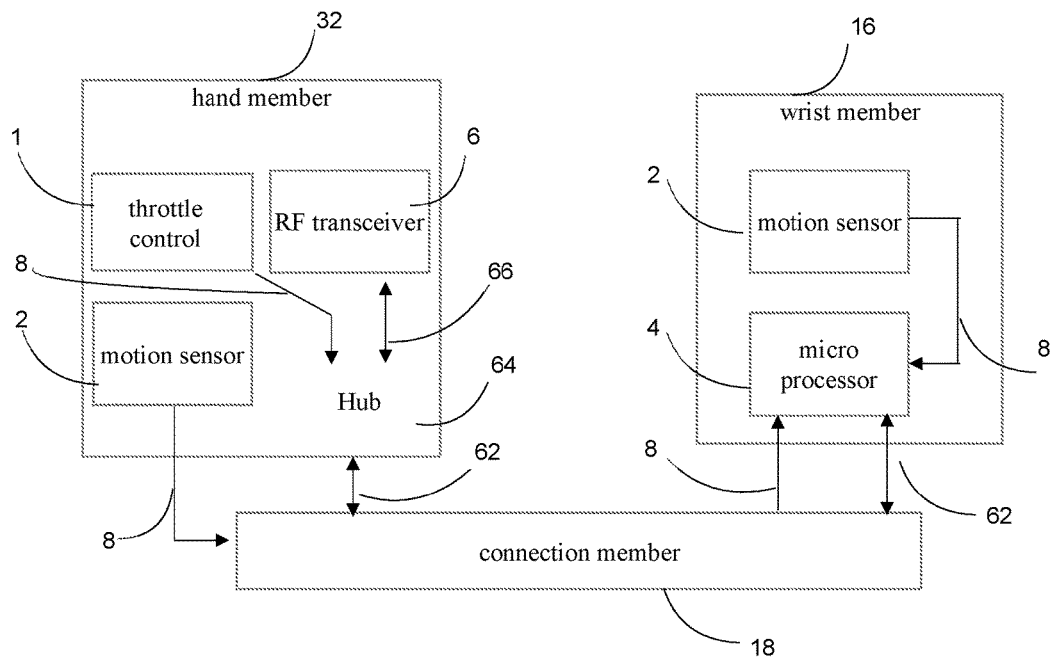
FIG. 18 is a block diagram of a remote control system that includes a hub member, for a UAV according to another exemplary embodiment.

Referring now to FIG. 18, another embodiment is shown that provides an improved control device in which the connection member (tether 18) has standard interfaces towards the hand member 32, so that the hand member 32 is exchangeable and replaceable. In this embodiment, a hub member 64 is incorporated into the hand member 32. The hub member 64 can be a computing chip that can receive signals from throttle control 1 or other buttons from an Analog to Digital Converter (ADC) interface. A piece of software running on the chip can convert these signals to a proper value, mix the data into a stream 62 and send it through a single interface to the wrist member 16. The RF transceiver 6 may also connect to the hub's data interface (for example, an SPI port), and the wireless data may be mixed into the single data stream 66. The chip's output port may be a USB port, and it can connect to a USB port connected to the microprocessor 4 in wrist member 16, with all data being transferred over a pair of wired lines. The microprocessor 4 may also send data to the hand member 32 through the pair of wired lines to the hub 64. The hub 64 may receive the data stream 62 from the micro-processor 4 (for example, flight instructions sent to UAV), de-multiplex the data from the stream 62 and forwards the de-multiplex data to the RF transceiver 6. In this way, a physical interface and a communication protocol is defined between the hand member 32 and the wrist member 16. In some embodiments, another hand member 32 (for example, one with a different RF transceiver) can be connected to the same wrist member 16, as long as the other hand member 32 is compatible with both the physical interface and the communication protocol. Different types of hand members 32 can thus be exchangeable to the same wrist member 16.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above. For example, while many features were described in the context of the micro-processor 4 managing software or process steps, it will be understood that some embodiments may include dedicated hardware such as dedicated electronic circuits designed to perform the comparisons and determinations described above.

What is claimed is:

1. A remote control system for an unmanned aerial vehicle (UAV), comprising
    a single-handed, hand held control housing;
    a push button throttle control in the control housing;
    a first motion sensor integrated into the hand held control housing;
    a radio transmitter in the hand held control housing;
    a micro-processor coupled to the push button throttle control, the radio transmitter, and the first motion sensor, wherein the micro-processor is configured to:
        detect a hand based movement by the first motion sensor;
        determine a type of the detected hand based movement;
        determine a mapped control instruction based on the determined type of hand based movement; and
        transmit the mapped control instruction to the UAV through the radio transmitter; and
    a wrist member coupled to the hand held control housing, the wrist member further comprising a second motion sensor configured to detect motion of a user's arm, wherein the wrist member is electrically tethered to the hand held control housing and data from the first motion sensor and the second motion sensor are shared to the micro-processor for determining the mapped control instruction.

2. The remote control system of claim 1, wherein the push button throttle control is spring biased and wherein a length of travel in a spring of the push button control is used to determine throttle of the UAV.

3. The remote control system of claim 1, further comprising:
    a third motion sensor integrated into the wrist member, wherein
    the second motion sensor and the third motion sensor are positioned axially symmetric around a wrist on which the wrist member is worn, the second motion sensor being attached to an outer surface of the wrist member and the third motion sensor being attached to an inner surface of the wrist member.

4. The remote control system of claim 3, wherein the detected hand based movement is one of radial/ulnar deviation, flexion/extension, and pronation/supination.

5. The remote control system of claim 4, wherein the radial/ulnar deviation, flexion/extension, and pronation/supination hand movements are each mapped to one of yaw, pitch, or roll control of the UAV.

6. The remote control system of claim 1, further comprising a gesture differentiator module configured to:
    calculate the relative space position of the user's hand to the user's arm, based on the estimated attitudes of the user's hand and the user's arm, and
    determine the UAV attitude based on the calculated relative space position of the user's hand to the user's arm, independent of the user's distance from the UAV.

7. The remote control system of claim 1, further comprising a module configured to:
    determine whether the single-handed, hand held control housing has been released from the user's grasp, and
    transmit a signal to the UAV indicating a transition status for the UAV.

8. The remote control system of claim 1, further comprising a module configured to:

determine whether the user's hand has returned to a default center position while grasping the single-handed, hand held control housing, and trigger an alarm to the user based on the determination.

9. The remote control system of claim 1, further comprising a throttle rate detector module configured to:

determine whether the throttle control of the single-handed, hand held control housing has been released from the user's grasp, and transmit a signal to the UAV indicating a transition status for the UAV.

* * * * *